United States Patent
Park et al.

(10) Patent No.: US 9,436,051 B2
(45) Date of Patent: Sep. 6, 2016

(54) DISPLAY DEVICE

(75) Inventors: JongSin Park, Paju-si (KR); HongSik Kim, Goyang-si (KR); JaeHyung Jo, Busan (KR)

(73) Assignee: LG DISPLAY CO., LTD., Seoul (KR)

( * ) Notice: Subject to any disclaimer, the term of this patent is extended or adjusted under 35 U.S.C. 154(b) by 305 days.

(21) Appl. No.: 13/561,887

(22) Filed: Jul. 30, 2012

(65) Prior Publication Data

US 2013/0057801 A1   Mar. 7, 2013

(30) Foreign Application Priority Data

Sep. 6, 2011  (KR) .................. 10-2011-0090261

(51) Int. Cl.
*G02F 1/1362* (2006.01)
*G02F 1/1333* (2006.01)
*H01J 29/32* (2006.01)

(52) U.S. Cl.
CPC ... *G02F 1/136209* (2013.01); *G02F 1/133308* (2013.01); *G02F 1/136286* (2013.01); *H01J 29/327* (2013.01)

(58) Field of Classification Search
CPC .................. G02F 1/133615; G02F 1/133512; G02F 1/136209; H01J 29/32
USPC .................... 349/44, 110, 149–152
See application file for complete search history.

(56) References Cited

U.S. PATENT DOCUMENTS

| | | | |
|---|---|---|---|
| 7,092,062 B2 * | 8/2006 | Ozawa .......................... | 349/152 |
| 7,259,806 B1 | 8/2007 | Lee et al. | |
| 7,259,820 B2 * | 8/2007 | Matsumoto ................... | 349/139 |
| 7,929,069 B2 * | 4/2011 | Song .............................. | 349/44 |
| 8,120,746 B2 * | 2/2012 | Shibahara et al. ............ | 349/169 |
| 8,643,800 B2 * | 2/2014 | Kim et al. ...................... | 349/44 |
| 2002/0126239 A1 | 9/2002 | Anno et al. | |
| 2007/0268231 A1 | 11/2007 | Kang et al. | |

FOREIGN PATENT DOCUMENTS

| | | |
|---|---|---|
| CN | 1374633 A | 10/2002 |
| CN | 101075031 A | 11/2007 |
| CN | 101825815 A | 9/2010 |
| CN | 102162941 A | 8/2011 |
| JP | 02005202439 * | 7/2005 |

\* cited by examiner

*Primary Examiner* — Dung Nguyen
(74) *Attorney, Agent, or Firm* — Birch, Stewart, Kolasch & Birch, LLP

(57) ABSTRACT

Discussed is a display device including: an upper substrate having gate and data lines; a lower substrate on a lower surface of the upper substrate with exposing a part of the lower surface of the upper substrate; and a first reflection preventing layer overlapping with the gate line, and a second reflection preventing layer overlapping with the data line are formed on the upper substrate so as to prevent reflection of external light being reflected by the gate line and data line.

10 Claims, 5 Drawing Sheets

DISPLAY DEVICE

CROSS REFERENCE TO RELATED APPLICATIONS

This application claims the benefit of the Korean Patent Application No. 10-2011-0090261 filed on Sep. 6, 2011, which is hereby incorporated by reference as if fully set forth herein.

BACKGROUND OF THE INVENTION

1. Field of the Invention

The present invention relates to a display device, and more particularly, to a display device which has a thin thickness and the enhanced aesthetic appearance.

2. Discussion of the Related Art

Various display devices, which substitute for CRT (Cathode Ray Tube) manufactured in an early stage of display device, have been researched and studied, for example, liquid crystal display device, plasma display panel, organic light emitting display device, and etc.

These display devices enable to achieve large size by decreasing weight and volume. Also, these display devices have been highly developed in various aspects such as response speed and picture quality through the continuous study.

In addition to the research and development in technical aspects, design aspects of a product that can appeal to consumers have been actively researched and studied. For example, efforts to minimize a thickness of a display device have been made, and a design enabling the good exterior appearance has been developed to expedite purchase of consumers by appealing to aesthetic sense of the consumers.

However, the related art display device obtained up to now has limitation in minimization of thickness and improvement of aesthetic appearance due to its structural properties. Hereinafter, limitation of the related art display device will be described in detail.

FIG. 1 is a cross sectional view of the related art display device.

As shown in FIG. 1, the related art display device includes a display panel 10, a panel driver 20, and a case 30.

The display panel 10 includes a lower substrate 12 and an upper substrate 14.

On the lower substrate 12, there are gate and data lines crossing each other to define a pixel region. At a crossing portion of the gate and data lines, there is a thin film transistor. Also, a pixel electrode connected with the thin film transistor is formed in the pixel region.

The upper substrate 14 is formed on the lower substrate 12. In this case, an one peripheral region of the lower substrate 12 has to be exposed to the external so as to apply a signal to the gate and data lines on the lower substrate 12, whereby the upper substrate 14 is not formed on one peripheral region of the lower substrate 12.

The panel driver 20 is formed in one peripheral region of the lower substrate 12 exposed to the external, to thereby transmit the signal to the gate and data lines.

The case 30 covers peripheral regions of the display panel 10. As mentioned above, since the panel driver 20 is formed in one peripheral region of the lower substrate 12, it is necessary to prevent the panel driver 20 from being exposed to the external. For this, the case 30 is applied thereto.

Accordingly, the case 30 covers the peripheral regions of the display panel 10 so as to prevent the panel driver 20 from being exposed to the external. Due to the structural properties, the case 30 is formed above the upper substrate 14, which causes the following problems.

First, the case 30 is formed above the upper substrate 14, whereby a thickness of the display device is increased.

Also, the case 30 protruding more than the upper substrate 14 causes a height difference on a front surface of the display device, thereby deteriorating the aesthetic appearance of the display device.

Since the case 30 is provided to prevent the exposure of panel driver 20, the case 30 is increased in width, whereby a bezel width of the display device is also increased, thereby causing the deteriorated aesthetic appearance of the display device.

SUMMARY OF THE INVENTION

Accordingly, the present invention is directed to a display device that substantially obviates one or more problems due to limitations and disadvantages of the related art.

An aspect of the present invention is to provide a display device which has a thin thickness and the enhanced aesthetic appearance.

To achieve these and other advantages and in accordance with the purpose of the invention, as embodied and broadly described herein, there is provided a display device comprising: an upper substrate having gate and data lines; a lower substrate on a lower surface of the upper substrate with exposing a part of the lower surface of the upper substrate; and a first reflection preventing layer overlapping with the gate line, and a second reflection preventing layer overlapping with the data line are formed on the upper substrate so as to prevent reflection of external light being reflected by the gate line and data line.

The first reflection preventing layer is formed between the upper substrate and the gate line. In this case, the first reflection preventing layer is formed on the upper substrate, and the gate line is formed on the first reflection preventing layer.

The second reflection preventing layer is formed between the upper substrate and the data line. In this case, the second reflection preventing layer is formed on the upper substrate, a gate insulating film is formed on the second reflection preventing layer, and the data line is formed on the gate insulating film. Differently, a gate insulating film is formed on the upper substrate, the second reflection preventing layer is formed on the gate insulating film, and the data line is formed on the second reflection preventing layer.

The lower substrate is formed to expose a pad region prepared on the lower surface of the upper substrate, and a panel driver is connected with the pad region on the lower surface of the upper substrate. In this case, the upper substrate extends more than the lower substrate so as to expose the pad region of the upper substrate.

In addition, the display device further comprises a backlight unit positioned under the lower substrate; and a support member for supporting the upper substrate, lower substrate, and backlight unit, wherein the support member includes a set cover being brought into contact with a lateral surface or lower surface of the upper substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Figure 1:
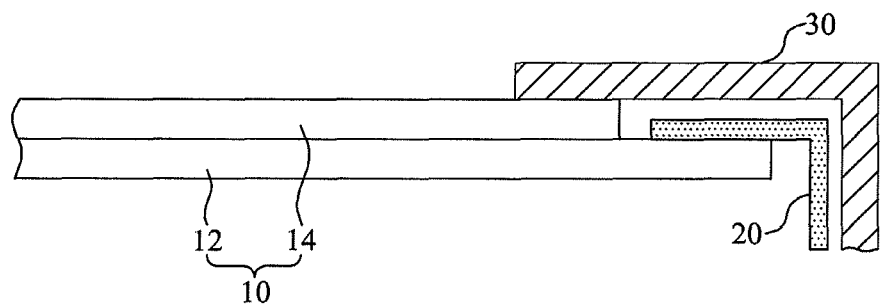
FIG. 1 is a cross sectional view of a related art display device.
Figure 2:
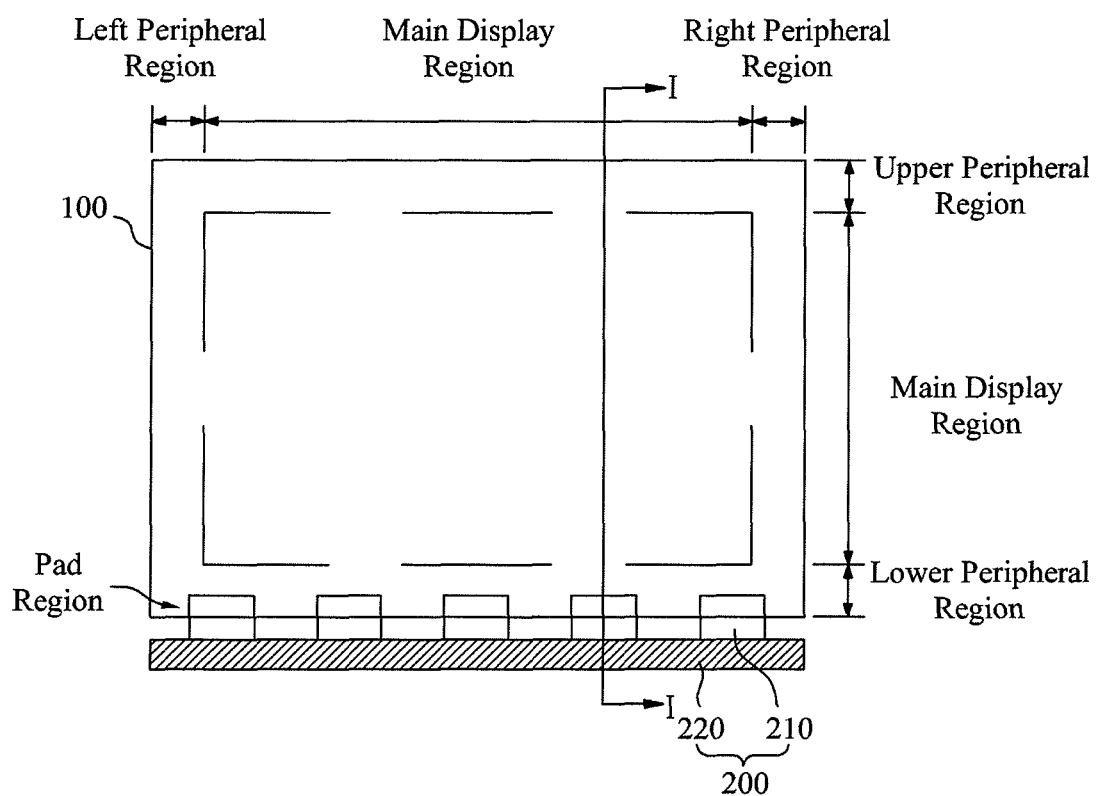
FIG. 2 is a plane view of a display device according to one embodiment of the present invention.

FIG. 2 is a plane view of a display device according to one embodiment of the present invention.

As shown in FIG. 2, the display device according to one embodiment of the present invention includes a display panel 100, and a panel driver 200 connected with the display panel 100.

The display panel 100 includes a main display region, and a peripheral region surrounding the main display region.

The main display region is positioned at the center of the display panel 100, wherein the main display region is displayed with a main screen image such as video image.

The peripheral region is positioned in the periphery of the display panel 100, that is, the peripheral region forms the border of the display panel 100. Generally, the peripheral region is not display with the main screen image such as video image. If needed, the peripheral region may be displayed with a supplementary screen image, for example, advertisement such as corporate logo, channel information, time information, volume information, or subtitle.

The peripheral region may include a left peripheral region, a right peripheral region, an upper peripheral region, and a lower peripheral region, which are respectively positioned at the left, right, upper and lower sides with respect to the main display region. Some of the peripheral regions may be provided with a pad region. The pad region is a region for forming a pad to supply a signal to the display panel 100. In the drawings, the pad region is formed in the lower peripheral region, but it is not limited to this structure.

The panel driver 200 is connected with the peripheral region of the display panel 100, and more particularly, the pad region. The panel driver 200 may include a plurality of circuit film 210 and a printed circuit board (PCB) 220.

The plurality of circuit films 210 may be provided at fixed intervals, and attached to the pad region of the display panel 100. Also, the plurality of circuit films 210 are connected with the PCB 220.

Although not shown, a COF (Chip On Film) structure may be made by forming a chip such as a data driving integrated circuit on the circuit film 210, or a COG (Chip On Glass) structure may be made by forming a chip on the display panel 100.

The PCB 220 supplies various signals to the display panel 100 through the circuit film 210. Although not shown, a timing controller, various power circuits, or memory device may be provided in the PCB 220.

In the drawings, the circuit film 210 is arranged while being spread out. However, the circuit film 210 may be arranged while being bent so as to minimize the increase of non-display area on which image is not displayed. This will be easily understood with reference to the following cross sectional views.

Figure 3A:
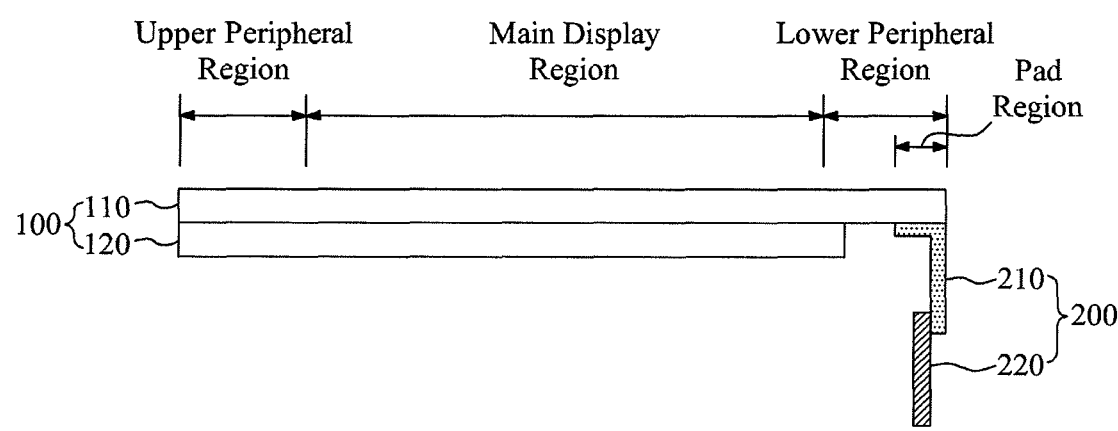
FIGS. 3A and 3B are cross sectional views of display devices according to various embodiments of the present invention.
Figure 3B:
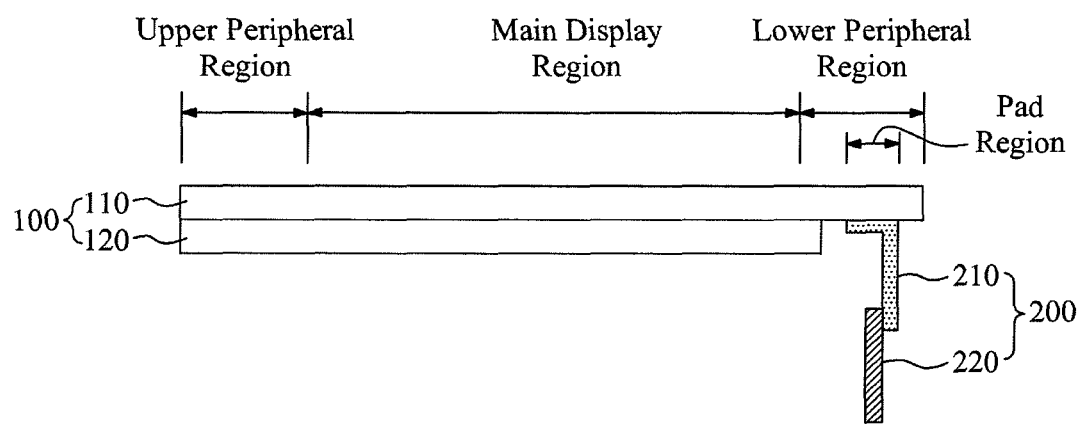

FIGS. 3A and 3B are cross sectional views of display devices according to various embodiments of the present invention, which are respective cross sectional views along I-I of FIG. 2.

As shown in FIGS. 3A and 3B, the display device according to the present invention includes a display panel 100 and a panel driver 200.

The display panel 100 includes an upper substrate 110 and a lower substrate 120. If the display panel 100 is a liquid crystal panel, a liquid crystal layer sealed by a sealant is formed between the upper substrate 110 and the lower substrate 120. Hereinafter, a case using the display panel 100 of the liquid crystal panel will be described in detail.

Although not shown, on the upper substrate 110, and more particularly, on a lower surface of the upper substrate 110 confronting the lower substrate 120, there are gate and data lines which cross each other to define a pixel region; a thin film transistor which functions as a switching device at the crossing portion of the gate and data lines; and a pixel electrode which is connected with the thin film transistor in each pixel region.

In the display device according to the present invention, the upper substrate 110 is formed of a thin film transistor substrate. Thus, a panel driver 200 for supplying signals to the gate and data lines is attached to the lower surface of the upper substrate 110, whereby the panel driver 200 is not exposed to the front surface of the display device.

In case of the related art, an additional case for covering the panel driver 200 exposed is inevitably provided on an upper surface of the upper substrate 110. Meanwhile, in case of the present invention, there is no need for the additional case. In this respect, the present invention enables to decrease a thickness of the display device, and to remove a step portion on the front surface of the display device, whereby the good aesthetic appearance is obtained as the front surface of the display device is seen as one structure.

The panel driver 200 is connected with the lower surface of the upper substrate 110 so that the lower substrate 120 is formed to expose the pad region connected with the panel driver 200. In the lower peripheral region provided with the pad region, the upper substrate 110 extends more than the lower substrate 120.

As shown in FIGS. 3A and 3B, in the upper peripheral region except the lower peripheral region provided with the pad region, the ends of the upper substrate 110 and lower substrate 120 correspond to each other, but it is not limited to this structure. In the upper peripheral region except the lower peripheral region provided with the pad region, the upper substrate 110 may extend more than the lower substrate 120.

As shown in FIG. 3A, the panel driver 200, more particularly, the circuit film 210 is attached to the end of the lower surface of the upper substrate 110, whereby the pad region is formed in the end of the display panel 100. As shown in FIG. 3B, the panel driver 200, more particularly, the circuit film 210 is not attached to the end of the lower surface of the upper substrate 110, whereby the pad region might not be formed in the end of the display panel 100.

On the upper substrate 110, more particularly, on the lower surface of the upper substrate 110, there are a plurality of gate lines and data lines, the gate and data lines crossing each other. Thus, external light incident on the upper surface of the upper substrate 110 may be reflected on the gate line and data line, which might cause deterioration of picture quality.

According to one embodiment of the present invention, in order to overcome a problem of deteriorating the picture quality by the external light reflected on the gate line and data line, a reflection preventing layer may be formed while being overlapped with the gate line and data line, which will be explained in detail.

Figure 4:
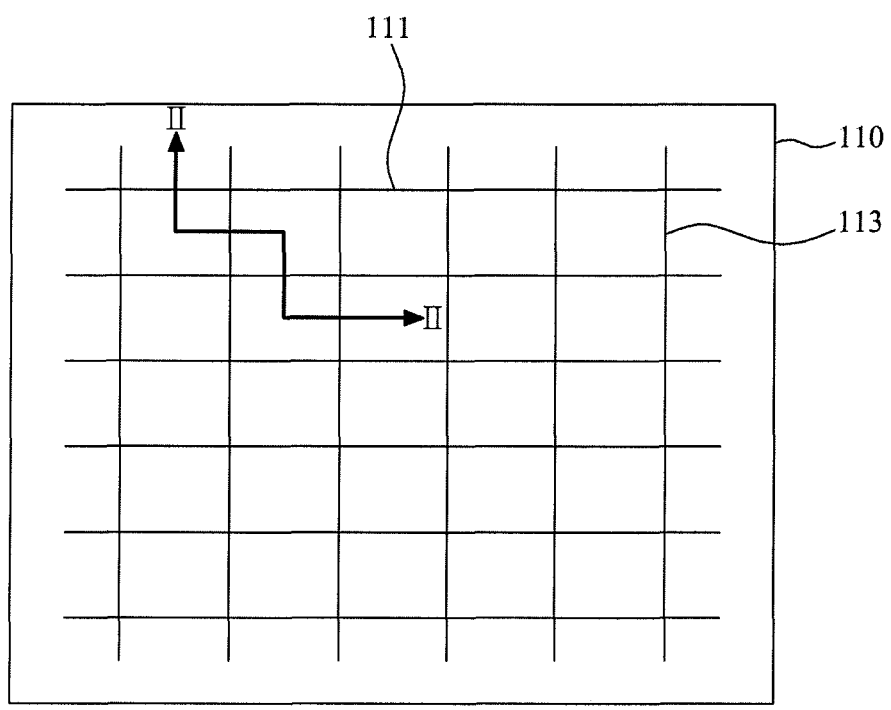
FIG. 4 is a plane view of an upper substrate according to one embodiment of the present invention.
Figure 5A:
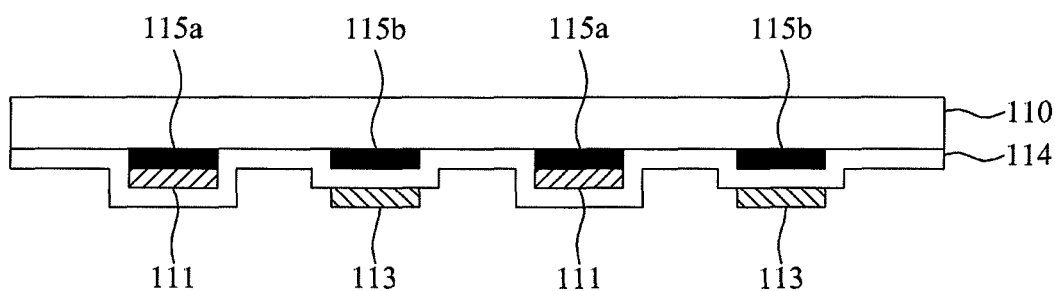
FIGS. 5A and 5B are cross sectional views of upper substrates according to various embodiments of the present invention.
Figure 5B:
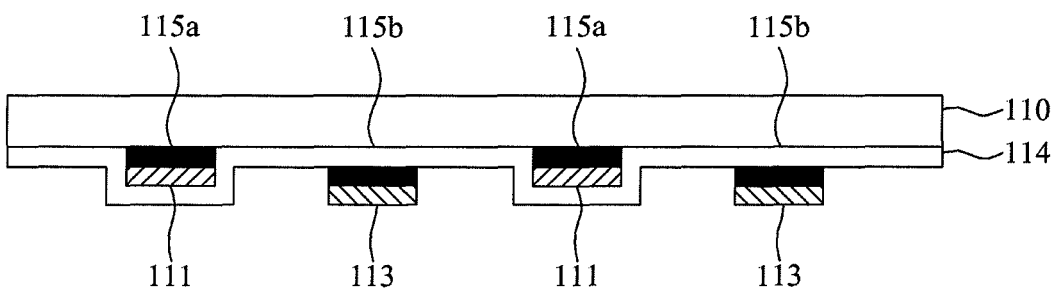

FIG. 4 is a plane view of an upper substrate according to one embodiment of the present invention. FIGS. 5A and 5B are cross sectional views of upper substrates according to various embodiments of the present invention, which are cross sectional views along II-II of FIG. 4.

As shown in FIG. 4, on an upper substrate 110, such transparent glass or plastic substrate, there are a plurality of gate lines 111 provided in a first direction, for example, horizontal direction; and a plurality of data lines 113 provided in a second direction which is different from the first direction, for example, vertical direction.

As shown in FIGS. 5A and 5B, the upper surface of the upper substrate 110 faces to an observer and gate line 111 is formed on the lower surface of the upper substrate 110, a first reflection preventing layer 115a is formed between the upper substrate 110 and the gate line 111, to thereby prevent light reflection on the gate line 111. Also, a second reflection preventing layer 115b is formed between the upper substrate 110 and the data line 113, to thereby prevent light reflection on the data line 113. This will be described in detail with reference to the accompanying drawings.

As shown in FIG. 5A, on the upper substrate 110, more particularly, on the lower substrate of the upper substrate 110, there are the first reflection preventing layer 115a and second reflection preventing layer 115b. Here, a buffer layer (not show) may be formed on the upper substrate to prevent the diffusion of impurity into a metal layer, thereby, the first reflection preventing layer 115a and second reflection preventing layer 115b may be formed on the buffer layer.

The gate line 111 is formed on the first reflection preventing layer 115a; a gate insulating film 114 is formed on the gate line 111; and the data line 113 is formed on the gate insulating film 114.

The first reflection preventing layer 115a prevents the light reflection on the gate line 111, whereby the first reflection preventing layer 115a is formed in a pattern corresponding to the gate line 111. Especially, in consideration of reflection-preventing efficiency, it is preferable that a width of the first reflection preventing layer 115a is larger than a width of the gate line 111. In this case, an aperture ratio may be deteriorated. Thus, in consideration of both reflection-preventing efficiency and aperture ratio, preferably, the width of the first reflection preventing layer 115a is the same as the width of the gate line 111.

The second reflection preventing layer 115b prevents the light reflection on the data line 113, whereby the second reflection preventing layer 115b is formed in a pattern corresponding to the data line 113. Similarly to the aforementioned first reflection preventing layer 115a, a width of the second reflection preventing layer 115b is the same as a width of the data line 113, preferably.

The first and second reflection preventing layers 115a and 115b may be formed of any material capable of decreasing the reflection on the gate line 111 and data line 113. For example, the first and second reflection preventing layers 115a and 115b may be formed of light shield material such as black matrix (BM), but not necessarily. Instead, the first and second reflection preventing layers 115a and 115b may be formed of an inorganic or organic insulating material, or a semiconductor material for a semiconductor layer of thin film transistor. If needed, the first and second reflection preventing layers 115a and 115b may be formed of a low reflective metal material generally known to those skilled in the art.

The first and second reflection preventing layers 115a and 115b may be formed of the same material, or may be formed of the different materials.

A method for manufacturing the upper substrate 110 shown in FIG. 5A will be described. First, the first and second reflection preventing layers 115a and 115b are patterned on the upper substrate 110, and then the gate line 111 is patterned on the first reflection preventing layer 115a. Thereafter, the gate insulating film 114 is patterned on the gate line 111, and then the data line 113 is patterned on the gate insulating film 114.

On the upper substrate 110, more particularly, on the lower surface of the upper substrate 110, as shown in FIG. 5B, the first reflection preventing layer 115a is formed thereon, and the gate line 111 is formed on the first reflection preventing layer 115a.

The gate insulating film 114 is formed on the gate line 111; the second reflection preventing layer 115b is formed on the gate insulating film 114; and the data line 113 is formed on the second reflection preventing layer 115b.

That is, as shown in FIG. 5A, the first and second reflection preventing layer 115a and 115b are formed at the same layer, whereby the second reflection preventing layer 115b is not brought into direct contact with the data line 113. Meanwhile, as shown in FIG. 5B, the first and second reflection preventing layers 115a and 115b are formed at the different layers, whereby the second reflection preventing layer 115b is brought into direct contact with the data line 113.

Except that the first and second reflection preventing layers 115a and 115b are formed at the different layers, the width and material for each of the first and second reflection preventing layers 115a and 115b on the upper substrate 110 shown in FIG. 5B are identical to those shown in FIG. 5A, whereby a detailed explanation for the same parts will be omitted.

A method for manufacturing the upper substrate 110 shown in FIG. 5B will be described. First, a material layer for first reflection preventing layer 115a is formed on the entire surface of the upper substrate 110, and then the gate line 111 is patterned on the material layer for first reflection preventing layer 115a. Thereafter, an etching process using the gate line 111 as a mask is carried out to thereby pattern the first reflection preventing layer 115a. The gate insulating film 114 is deposited on the gate line 111. Then, a material layer for second reflection preventing layer 115b is formed on the entire surface of the gate insulating film 114, and the data line 113 is patterned on the material layer for second reflection preventing layer 115b. An etching process using the data line 113 as a mask is carried out to thereby pattern the second reflection preventing layer 115b.

However, it is not limited to the above. First, a material layer for first reflection preventing layer 115a and a material layer for gate line 111 are sequentially deposited on the upper substrate 110; and the first reflection preventing layer 115a and gate line 111 are simultaneously patterned by photolithography. The gate insulating film 114 is deposited on the gate line 111. Then, a material for second reflection preventing layer 115b and a material layer for data line 113 are sequentially deposited on the gate insulating film 114; and the second reflection preventing layer 115b and data line 113 are simultaneously patterned by photolithography.

For the above description, the first and second reflection preventing layers 115a and 115b are formed on the lower surface of the upper substrate 110. If needed, the first and second reflection preventing layers 115a and 115b may be formed on the upper surface of the upper substrate 110. Especially, if an upper polarizing plate is formed on the upper surface of the upper substrate 110, the first and second reflection preventing layers 115a and 115b may be formed on an upper surface of the upper polarizing plate.

Figure 6A:
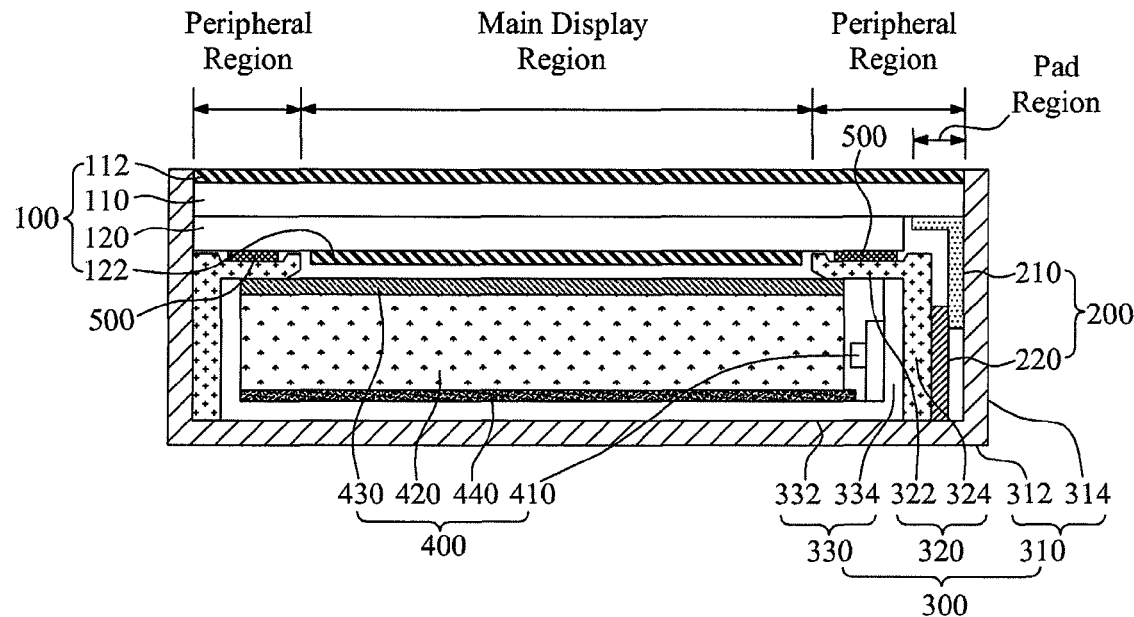
FIGS. 6A and 6B are cross sectional views of liquid crystal display devices according to various embodiments of the present invention.
Figure 6B:
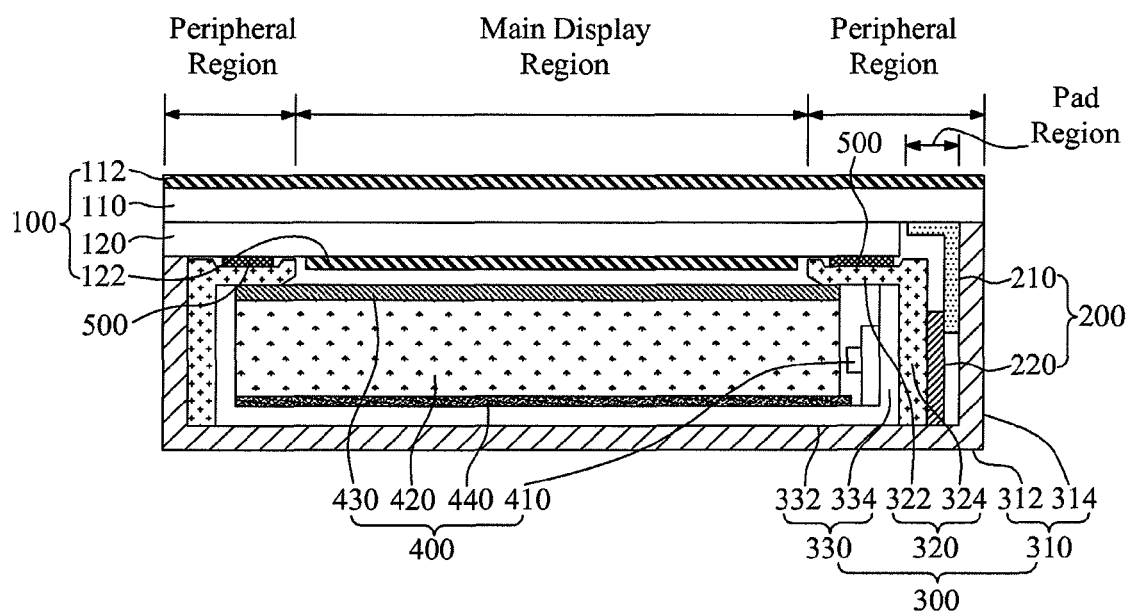

FIGS. 6A and 6B are cross sectional views of display devices, and more particularly, liquid crystal display devices according to various embodiments of the present invention, which are respective cross sectional views along I-I of FIG. 2. Hereinafter, these embodiments of the present invention will be described in detail.

FIG. 6A is a cross sectional view of a liquid crystal display device according to one embodiment of the present invention.

As shown in FIG. 6A, the liquid crystal display device according to one embodiment of the present invention includes a display panel 100, a panel driver 200, a support member 300, a backlight unit 400, and a connection member 500.

The display panel 100 includes an upper substrate 110, an upper polarizing plate 112, a lower substrate 120, a lower polarizing plate 122, and a liquid crystal layer (not shown) between the upper substrate 110 and the lower substrate 120.

The upper polarizing plate 112 is formed on an upper surface of the upper substrate 110, and the lower polarizing plate 122 is formed on a lower surface of the lower substrate 120. By combination of the upper polarizing plate 112 and lower polarizing plate 122, light transmittance is controlled so that images are displayed.

Although not shown, a retarder film for converting 2-dimentional image into 3-dimentional image may be additionally formed on the upper polarizing plate 112, which will be identically applied to the following embodiments of the present invention.

Except that the upper polarizing plate 112 and lower polarizing plate 122 are additionally formed, the display panel 100 shown in FIG. 6A is the same as the above display panel 100 shown in FIG. 3A. Also, the upper substrate 110 shown in FIG. 6A may be changed to the above upper substrate shown in FIGS. 5A and 5B, whereby repetitive descriptions for the same part will be omitted.

The panel driver 200 may include a circuit film 210 and a printed circuit board (PCB) 220. The panel driver 200 shown in FIG. 6A is the same as the above panel driver 200 shown in FIG. 3A, whereby repetitive descriptions for the same part will be omitted.

The support member 300 supports the display panel 100, the panel driver 200, and the backlight unit 400, wherein the support member 300 functions as an external cover. In more detail, the support member 300 includes a set cover 310, a guide frame 320, and a support case 330.

The set cover 310 functions as an external cover of display device such as notebook computer. Especially, the set cover 310 functions as lower and lateral covers of the display device. For this, the set cover 310 includes a plate 312, and a sidewall 314 extending and bent from one end of the plate 312.

The plate 312 functions as the lower cover of the display device, and the sidewall 314 functions as the lateral cover of the display device. The sidewall 314 is brought into contact with a lateral surface of the display panel 100, whereby the sidewall 314 forms a bezel of the display device. Thus, in comparison to the related art, a bezel width is largely decreased. In this case, a height of the sidewall 314 corresponds to a height of the display panel 100, whereby the display device has an entirely-flat front surface.

The set cover 310 is provided with a predetermined space prepared by combining the plate 312 and the sidewall 314. The display panel 100, panel driver 200, guide frame 320, support case 330, and backlight unit 400 are received in the predetermined space.

The guide frame 320 guides the position of the backlight unit 400, and supports the display panel 100. For this, the guide frame 320 includes a first support 322 and a first guide 324.

The first support 322 supports the lower surface of the display panel 100, especially, the lower edge of the lower substrate 120. The first guide 324 extends from the first support 322, and guides the position of support case 330 and backlight unit 400. Also, the PCB 220 of the panel driver 200 may be fixed to the first guide 324 by a double-sided adhesive.

The support case 330 guides the position of the backlight unit 400, and supports the backlight unit 400. For this, the support case 330 includes a second support 332 and a second guide 334.

The second support 332 supports the lower surface of the backlight unit 400; and the second guide 334 extends from the second support 332, and guides the position of the backlight unit 400 while facing the lateral surface of the backlight unit 400.

Also, the support case 330 uniformly transmits heat generated from the backlight unit 400, to thereby discharge the heat. That is, since the backlight unit 400 emits the light, a device for discharging the heat generated from the backlight unit 400 might be needed. Thus, if the support case 330 is formed of a metal material enabling heat conduction, the heat generated from the backlight unit 400 may be discharged to the outside through the support case 330.

However, the support case 330 may be omitted if needed. In this case, the backlight unit 400 may be supported by the aforementioned set cover 310.

The connection among the set cover 310, guide frame 320 and support case 330 constituting the support member 300, that is, the connection between the set cover 310 and guide frame 320, the connection between the set cover 310 and support case 330, or the connection between the guide frame 320 and support case 330 may be completed by the use of double-sided adhesive, by the use of hook connection using groove and projector, or by the use of bolt and nut.

The backlight unit 400 may be positioned under the display panel 100, whereby the backlight unit 400 supplies light to the display panel 100. As mentioned above, the position of the backlight unit 400 may be guided by the guide frame 320 and support case 330.

The backlight unit 400 may be classified into a direct type and an edge type. In case of the direct type, a light source is positioned under an entire lower surface of the display panel 100, whereby light emitted from the light source is directly transmitted to the display panel 100. Meanwhile, in case of the edge type, a light source is positioned at one lower side of the display panel 100, whereby light emitted from the light source is transmitted to the display panel 100 through a light guide plate. The present invention may be applied to any one of the direct type and the edge type. In the drawings, the edge-type backlight unit 400 is illustrated, but it is not limited to the edge type.

The backlight unit 400 includes a light source 410, a light guide plate 420, an optical sheet 430, and a reflective plate 440.

The light source 410 is provided to face the lateral side of the light guide plate 420. The light emitted from the light source 410 is incident on the light guide plate 420, and then the path of light incident on the light guide plate 420 is changed toward the display panel 100. The light source 410 may be light-emitting diode or fluorescent lamp.

The light guide plate 420 changes the path of light emitted from the light source 410 toward the display panel 100. For the change of light path, although not shown, the light guide plate 420 may be provided with groove patterns or project patterns formed in various shapes.

The optical sheet 430 is formed on the light guide plate 420, wherein the optical sheet 430 uniformly supplies the light toward the display panel 100. The optical sheet 430 may be formed by combination of diffusion sheet and prism sheet.

The reflective plate 440 is formed under the light guide plate 420, wherein the reflective plate 440 reflects the light leaking in the light guide plate 420 upward, to thereby improve light efficiency.

The connection member 500 connects the display panel 100 with the support member 300. In more detail, the connection member 500 is formed between the display panel 100 and the guide frame 320, to thereby connect the display panel 100 with the guide frame 320. That is, the connection member 500 prevents the display panel 100 from being separated upward. The connection member 500 may be formed of an adhesive such as a double-sided tape, a thermosetting adhesive, or a photocurable adhesive.

Meanwhile, the lower polarizing plate 122 of the display panel 100 is not formed in the area with the connection member 500. That is, the connection member 500 is formed between the lower substrate 120 and the first support 322 of the guide frame 320, to thereby prevent the thickness of display device from being increased by addition of the connection member 500.

FIG. 6B is a cross sectional view of a liquid crystal display device according to another embodiment of the present invention.

As shown in FIG. 6B, the liquid crystal display device according to another embodiment of the present invention includes a display panel 100, a panel driver 200, a support member 300, a backlight unit 400, and a connection member 500.

The display panel 100 includes an upper substrate 110, an upper polarizing plate 112, a lower substrate 120, a lower polarizing plate 122, and a liquid crystal layer (not shown) between the upper substrate 110 and the lower substrate 120. Except that the upper polarizing plate 112 and lower polarizing plate 122 are additionally formed, the display panel 100 shown in FIG. 6B is the same as the above display panel 100 shown in FIG. 3B. Also, the upper substrate 110 shown in FIG. 6B may be changed to the above upper substrate shown in FIGS. 5A and 5B, where repetitive descriptions for the same part will be omitted.

The panel driver 200 may include a circuit film 210 and a printed circuit board (PCB) 220. The panel driver 200 shown in FIG. 6B is the same as the above panel driver 200 shown in FIG. 3B, whereby repetitive descriptions for the same part will be omitted.

The support member 300 includes a set cover 310, a guide frame 320, and a support case 330. Except a structure of the set cover 310, the support member 300 is the same as that shown in FIG. 6A, whereby only different parts thereof will be described.

As shown in FIG. 6B, the set cover 310 includes a plate 312, and a sidewall 314 extending and bent from one end of the plate 312. In this case, the sidewall 314 is not brought into contact with the lateral side of the display panel 100, and is brought into contact with the lower surface of the display panel 100.

Especially, in the peripheral region of the display panel 100 with a pad region, the upper substrate 110 extends more than the lower substrate 120, whereby the sidewall 314 is brought into contact with the lower surface of the upper substrate 110 of the display panel 100. In the peripheral region of the display panel 100 without the pad region, the ends of the lower substrate 120 and upper substrate 110 correspond to each other, whereby the sidewall 314 is brought into contact with the lower surface of the lower substrate 120 of the display panel 100, but not limited to this structure. Even in the peripheral region of the display panel 100 without the pad region, the upper substrate 110 may extend more than the lower substrate 120. In this case, the sidewall 314 may be brought into contact with the lower surface of the upper substrate 110 of the display panel 100.

In case of the structure shown in FIG. 6B, since the sidewall 314 is brought into contact with the lower surface of the display panel 100, the bezel of the display device is completely removed, to thereby obtain the good aesthetic appearance of the display device.

The sidewall 314 is not brought into contact with the lateral side of the display panel 100, whereby the front surface of the display device is formed only by the display panel 100.

The backlight unit 400 includes a light source 410, a light guide plate 420, an optical sheet 430, and a reflective plate 440. The backlight unit 400 shown in FIG. 6B is the same as the above backlight unit 400 shown in FIG. 4A, whereby repetitive descriptions for the same part will be omitted.

The connection member 500 shown in FIG. 6B is the same as the above connection member shown in FIG. 6A, whereby repetitive descriptions for the same part will be omitted.

The above description for the present invention relates to the liquid crystal display device corresponding to one of various display devices, however, the present invention is not limited to the liquid crystal display device. The present invention may be applied to the various display devices such as organic light emitting device.

Accordingly, the panel driver 200 is attached to the lower surface of the upper substrate 110, whereby the panel driver 200 is not exposed to the front surface of the display device. In this respect, there is no need for an additional case on the upper surface of the upper substrate 110. In case of the related art, the case is provided to cover the panel driver 200. Thus, according to the present invention, the thickness of the display device is decreased, and the front surface of the display device has no step portion, whereby the good aesthetic appearance is obtained since the front surface of the display device is seen as one structure.

Also, the reflection preventing layer is formed on the upper substrate 110 of the display device according to the present invention, to thereby overcome a problem of deteriorating picture quality by the light reflection on the gate and data lines.

The above explanation shows a display device corresponding to one of the display devices. However, the display devices according to the present invention are not limited to the above liquid crystal display device. The display devices according to the present invention may be applied to various flat display devices such as organic light emitting display device (OLED), EPD, etc. For example, in case of the display device of the organic light emitting display device, an organic light emitting device is formed on upper or lower substrate, and the organic light emitting device is driven by a panel driver connected to the upper substrate so that an image is displayed by light emitted to the external through the upper substrate.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
    an upper substrate having gate lines and data lines, wherein each of a plurality of crossing portions of a corresponding gate line and data line is at a thin film transistor connected to the corresponding gate line and data line;
    a lower substrate on a lower surface of the upper substrate and exposing a part of the lower surface of the upper substrate; and
    a first reflection preventing layer overlapping the gate lines, and a second reflection preventing layer overlapping the data lines formed on the upper substrate so as to prevent external light from being reflected by the gate lines and the data lines,
    wherein the first reflection preventing layer has a pattern corresponding to the gate lines,
    wherein the second reflection preventing layer has a pattern corresponding to the data lines,
    wherein the gate lines directly contact the first reflection preventing layer,
    wherein, in a cross-sectional view, a width of each of separate portions of the first reflection preventing layer is equal to a width of the corresponding gate line, and a width of each of separate portions of the second reflection preventing layer is equal to a width of the corresponding data line, and
    wherein a gate insulating film is on both the first reflection preventing layer and the gate lines.

2. The display device according to claim 1, wherein the part of the lower surface of the upper substrate is a peripheral region of the upper substrate.

3. The display device according to claim 1, wherein the first reflection preventing layer is disposed between the upper substrate and the gate lines.

4. The display device according to claim 3, wherein the first reflection preventing layer is disposed on the upper substrate.

5. The display device according to claim 1, wherein the second reflection preventing layer is disposed between the upper substrate and the data lines.

6. The display device according to claim 5, wherein the gate insulating film is between the second reflection preventing layer and the data lines, and
    wherein the second reflection preventing layer is formed on the upper substrate, and the data lines are formed on the gate insulating film.

7. The display device according to claim 5, further comprising a gate insulating film is formed on the upper substrate;
    wherein the second reflection preventing layer is formed on the gate insulating film, and the data line is formed on the second reflection preventing layer.

8. The display device according to claim 1, further comprising a panel driver connected with a pad region prepared on the part of the lower surface of the upper substrate,
    wherein the lower substrate is formed to expose the pad region.

9. The display device according to claim 8, further comprising:
    a backlight unit positioned under the lower substrate; and
    a support member for supporting the upper substrate, lower substrate, and backlight unit, wherein the support member includes a set cover being brought into contact with a lateral surface of the upper substrate.

10. The display device according to claim 8, further comprising:
    a backlight unit positioned under the lower substrate; and
    a support member for supporting the upper substrate, lower substrate, and backlight unit, wherein the support member includes a set cover being brought into contact with a lower surface of the upper substrate.

* * * * *